(12) United States Patent
Nagatani

(10) Patent No.: US 12,244,614 B2
(45) Date of Patent: Mar. 4, 2025

(54) ANALYSIS SYSTEM, METHOD, AND PROGRAM

(71) Applicant: NEC Corporation, Tokyo (JP)

(72) Inventor: Noboru Nagatani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 252 days.

(21) Appl. No.: 17/908,152

(22) PCT Filed: Jan. 27, 2021

(86) PCT No.: PCT/JP2021/002833
§ 371 (c)(1),
(2) Date: Aug. 30, 2022

(87) PCT Pub. No.: WO2021/192587
PCT Pub. Date: Sep. 30, 2021

(65) Prior Publication Data
US 2023/0129114 A1    Apr. 27, 2023

(30) Foreign Application Priority Data

Mar. 24, 2020 (JP) .................. 2020-052831

(51) Int. Cl.
*H04L 9/40* (2022.01)
*H04L 41/22* (2022.01)

(52) U.S. Cl.
CPC .......... *H04L 63/1416* (2013.01); *H04L 41/22* (2013.01); *H04L 63/1466* (2013.01)

(58) Field of Classification Search
CPC . H04L 63/1416; H04L 41/22; H04L 63/1466; H04L 63/20; H04L 41/12; H04L 63/1433; G06F 21/57
See application file for complete search history.

(56) References Cited

U.S. PATENT DOCUMENTS

2015/0058993 A1   2/2015  Choi et al.
2017/0078322 A1*  3/2017  Seiver ................. H04L 63/1433

FOREIGN PATENT DOCUMENTS

| JP | 2008257577 A | * | 10/2008 |
| JP | 2015-191390 A | | 11/2015 |
| JP | 2018077597 A | * | 5/2018 |
| WO | 2008/004498 A1 | | 1/2008 |

OTHER PUBLICATIONS

International Search Report for PCT Application No. PCT/JP2021/002833, mailed on Apr. 27, 2021.

* cited by examiner

*Primary Examiner* — Henry Tsang

(57) ABSTRACT

A topology identification unit identifies a network topology of devices included in the system to be diagnosed. A detection unit detects attack routes that indicate flows of attacks that can be executed in the system to be diagnosed, based on security information about each device. A countermeasure identification unit identifies countermeasure plans to prevent the attacks and a cost required to implement the countermeasure plans.

8 Claims, 13 Drawing Sheets

FIG. 4

FIRST TABLE

| SOFTWARE NAME | VULNERABILITY |
|---|---|
| SOFTWARE A | CVE-2017-0*** |
| SOFTWARE B | CVE-2016-00** |
| SOFTWARE C | ABUSE OF FTP |
| SOFTWARE D | CVE-2015-**** |
| ⋮ | ⋮ |

SECOND TABLE

| VULNERABILITY | EVALUATION VALUE |
|---|---|
| CVE-2017-0*** | 9 |
| CVE-2016-00** | 7 |
| CVE-2015-**** | 4 |
| ABUSE OF FTP | 8 |
| ⋮ | ⋮ |

FIG. 5

| FUNCTION OF DEVICE | ATTACK TYPE | DAMAGE INFORMATION |
|---|---|---|
| ACCOUNT SERVER FUNCTION | OBTAINING ADMINISTRATIVE PRIVILEGES | LEAKAGE OF ACCOUNT INFORMATION |
| HUMAN RESOURCES INFORMATION MANAGEMENT SERVER FUNCTION | TAMPERING DATA | LEAKAGE OF HUMAN RESOURCES INFORMATION |
| ⋮ | ⋮ | ⋮ |

FIG. 6

| DAMAGE INFORMATION | COUNTERMEASURE PLAN | COST |
|---|---|---|
| LEAKAGE OF ACCOUNT INFORMATION | AWARENESS RAISING TO MEMBERS OF DEPARTMENT | 2 |
| | APPLYING PATCH | 4 |
| | IMPROVING SECURITY LEVEL OF FIREWALL | 8 |
| | ⋮ | ⋮ |
| LEAKAGE OF HUMAN RESOURCES INFORMATION | AWARENESS RAISING TO MEMBERS OF DEPARTMENT | 2 |
| | APPLYING PATCH | 4 |
| | IMPROVING SECURITY LEVEL OF FIREWALL | 8 |
| | ⋮ | ⋮ |
| ⋮ | ⋮ | ⋮ |

| ATTACK ROUTE | EVALUATION VALUE | COUNTERMEASURE PLAN | COST |
|---|---|---|---|
| 50 | 13 | DEVICE b: "AWARENESS RAISING TO MEMBERS OF DEPARTMENT"<br>DEVICE c: "AWARENESS RAISING TO MEMBERS OF DEPARTMENT" | 4 |
| | | DEVICE b: "APPLYING PATCH"<br>DEVICE c: "AWARENESS RAISING TO MEMBERS OF DEPARTMENT" | 6 |
| | | . . . | . . . |
| 51 | 7 | . . . | . . . |

FIG. 12

| VULNERABILITY | DEVICE | AUTHENTI-CATION | NUMBER OF CHARACTERS IN PASSWORD | LOCKOUT PERIOD | AUTHENTI-CATION INTERVAL | PRESENCE OF ATTACK TOOLS | ACCESS VECTOR | ACCESS COMPLEXITY | TIME INFOR-MATION |
|---|---|---|---|---|---|---|---|---|---|
| CVE-2017-9*99 | SERVER | SINGLE | 9 | 60 MINUTES | 10 SECONDS | NOT PRESENT | LOCAL | HIGH | 20 |
| CVE-2017-9*99 | SERVER | SINGLE | 8 | 20 MINUTES | 5 SECONDS | NOT PRESENT | LOCAL | HIGH | 17 |
| CVE-2017-9*99 | SERVER | SINGLE | 6 | 0 SECONDS | 0 SECONDS | NOT PRESENT | LOCAL | HIGH | 15 |
| ·· | ·· | SINGLE | ·· | ·· | ·· | NOT PRESENT | LOCAL | HIGH | ·· |
| CVE-2016-8*88 | ROUTER | UN-NECESSARY | — | — | — | PRESENT | NETWORK | LOW | 5 |
| ABUSE OF FTP | — | — | — | — | — | — | — | — | 10 |
| ABUSE OF Telnet | — | — | — | — | — | — | — | — | 10 |
| ·· | ·· | ·· | ·· | ·· | ·· | ·· | ·· | ·· | ·· |

ANALYSIS SYSTEM, METHOD, AND PROGRAM

This application is a National Stage Entry of PCT/JP2021/002833 filed on Jan. 27, 2021, which claims priority from Japanese Patent Application 2020-052831 filed on Mar. 24, 2020, the contents of all of which are incorporated herein by reference, in their entirety.

TECHNICAL FIELD

The present invention relates to an analysis system, an analysis method, and an analysis program that display information that can be used as a basis for making decisions about how to deal with an attack on a system to be diagnosed.

BACKGROUND ART

It is required for, information processing systems that include the plurality of computers, to take security measures to protect information assets from cyber attacks. The security measures include assessing the vulnerability and the like of the target system and removing vulnerabilities as necessary.

Patent Literature (PTL) 1 describes a security risk management system that is capable of analyzing risks based on the status of the system in operation and presenting the optimal countermeasure method from a list of candidate countermeasures to mitigate the risks, taking into account various constraints that may occur in the system in operation.

In addition, PTL 2 describes a security measure support system that enables non-experts in security to build a model of security causal relationships and provide appropriate security measure support.

In addition, PTL 3 describes a security measure planning support system that makes it possible to plan appropriate security measures for large-scale systems as a whole, including social infrastructure systems.

CITATION LIST

Patent Literature

PTL 1: International Publication No. WO 2008/004498
PTL 2: Japanese Patent Application Laid-Open No. 2015-191390
PTL 3: Japanese Patent Application Laid-Open No. 2018-077597

SUMMARY OF INVENTION

Technical Problem

The system that is the target of the security diagnosis is referred to as the system to be diagnosed.

The budget available to implement measures related to security for the system to be diagnosed is limited. Due to the limited budget, the security administrator cannot implement all measures. The security administrator is required to implement the most appropriate measures within the budget.

For example, if the cost required for implementing countermeasures is presented, the security administrator can easily determine which countermeasures should be implemented within their budget. Also, if the degree of risk from attacks on the system to be diagnosed is presented, the security administrator can easily determine which countermeasures against attacks should be implemented preferentially.

Therefore, it is an object of the present invention to provide an analysis system, an analysis method, and an analysis program that can present bases for an administrator to select security measures to be implemented in the system to be diagnosed.

Solution to Problem

An analysis system according to the present invention is an analysis system includes a topology identification unit that identifies a network topology of devices included in a system to be diagnosed, a detection unit that detects attack routes that indicate flows of attacks that can be executed in the system to be diagnosed, based on security information about each device, and a countermeasure identification unit that identifies countermeasure plans to prevent the attacks and costs required to implement the countermeasure plans.

An analysis method according to the present invention is an analysis method implemented by a computer, and includes identifying a network topology of devices included in a system to be diagnosed, detecting attack routes that indicate flows of attacks that can be executed in the system to be diagnosed, based on security information about each device, and identifying countermeasure plans to prevent the attacks and costs required to implement the countermeasure plans.

An analysis program according to the present invention, causing a computer to execute a topology identification process of identifying a network topology of devices included in a system to be diagnosed, a detection process of detecting attack routes that indicate flows of attacks that can be executed in the system to be diagnosed, based on security information about each device, and a countermeasure identification process of identifying countermeasure plans to prevent the attacks and costs required to implement the countermeasure plans.

Advantageous Effects of Invention

According to this invention, it is possible to present bases for an administrator to select security measures to be implemented in the system to be diagnosed.

BRIEF DESCRIPTION OF DRAWING

FIG. 4 is a schematic diagram showing an example of information stored in the risk information storage unit.

FIG. 5 is a schematic diagram showing an example of information stored in the damage information storage unit.

FIG. 6 is a schematic diagram showing an example of information stored in the countermeasure information storage unit.

FIG. 12 is a schematic diagram showing an example of a table that stores predetermined time information according to the type of vulnerability, or the type of vulnerability, device and device settings.

Description of Embodiments

Example embodiments of the present invention will be described below, with reference to the drawings. As an analysis system 1 in each example embodiment, an analysis system is assumed to analyze a system to be diagnosed by virtualizing the system to be diagnosed and performing simulations based on information on each device, etc.

Example Embodiment 1

Figure 1:
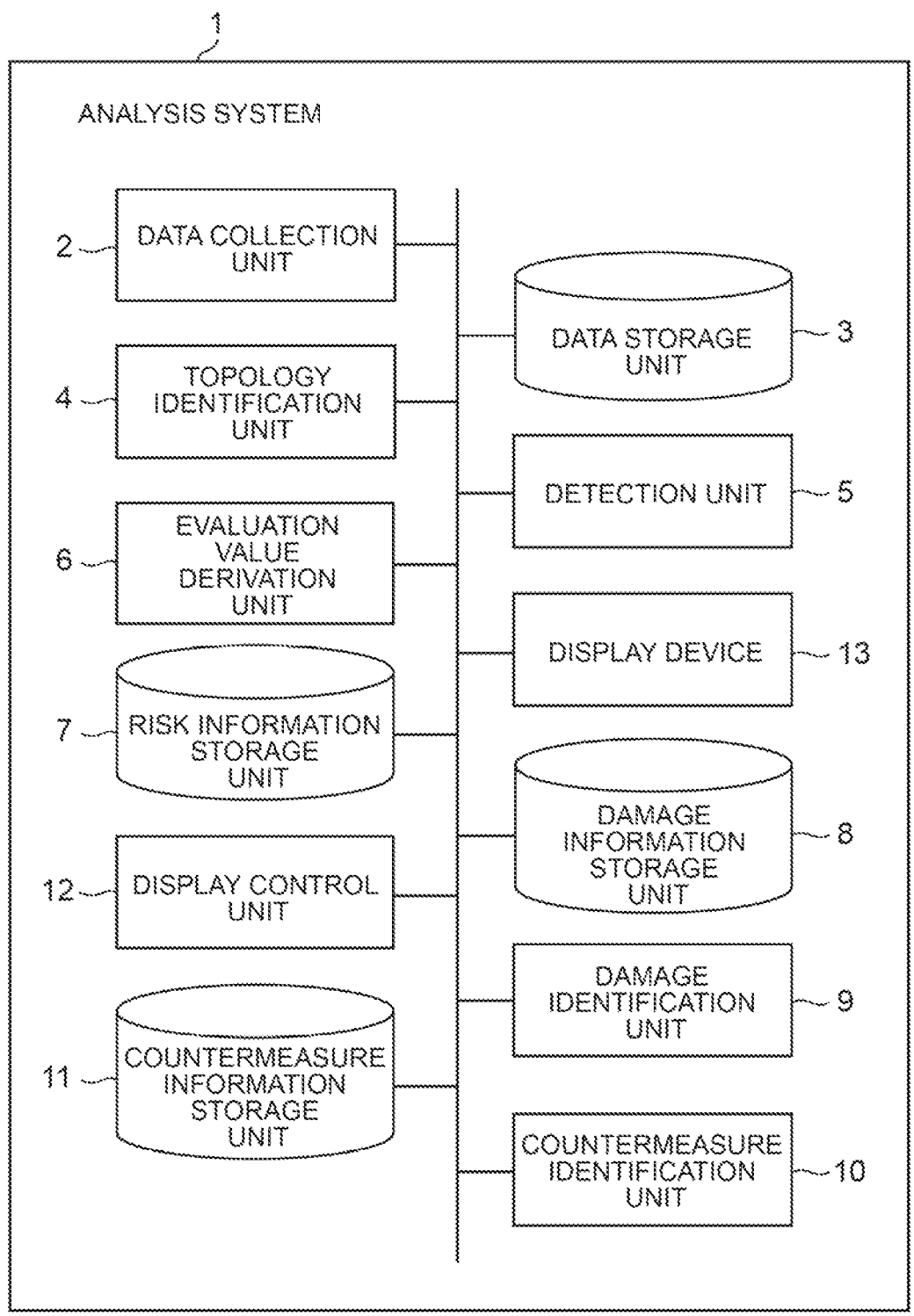
FIG. 1 is a block diagram showing an example of the analysis system of the first example embodiment of the present invention.

FIG. 1 is a block diagram showing an example of the analysis system of the first example embodiment of the present invention. The analysis system 1 of the first example embodiment includes a data collection unit 2, a data storage unit 3, a topology identification unit 4, a detection unit 5, an evaluation value derivation unit 6, a risk information storage unit 7, a damage information storage unit 8, a damage identification unit 9, a countermeasure identification unit 10, a countermeasure information storage unit 11, a display control unit 12, and a display device 13.

The data collection unit 2 collects information on each device included in the system to be diagnosed (the system that is the target of the security diagnosis).

Examples of systems to be diagnosed include, for example, IT (Information Technology) systems in companies and so-called OT (Operational Technology) systems for controlling factories and plants and the like. However, the systems to be diagnosed are not limited to these systems. A system in which the plurality of devices are connected via a communication network can be a system to be diagnosed.

Each device included in the system to be diagnosed is connected via a communication network. Examples of devices included in the system to be diagnosed include personal computers, servers, switches, routers, machine tools installed in factories, and control devices for machine tools. However, devices are not limited to the above examples. The devices may be physical devices or virtual devices.

Examples of information collected by the data collection unit 2 include, for example, information on the operating system (OS) installed in the device and its version, information on the hardware configuration installed in the device, information on the software installed in the device and its version, information on the communication data exchanged between the device and other devices and the communication protocol used to exchange the communication data, and information on the status of the ports of the device (which ports are open) and the like. The communication data includes information on the source and destination of the communication data. However, the examples of information collected by the data collection unit 2 are not limited to the above examples. The data collection unit 2 may collect other information as information about the device.

The data collection unit 2 may collect information about the devices directly from each device included in the system to be diagnosed. In this case, the analysis system 1 may be connected to each device via a communication network. In addition, the data collection unit 2 may collect information from each device via the communication network.

Alternatively, the data collection unit 2 may obtain information about each device from an information collection server that collects information about each device. In this case, the analysis system 1 may be connected to the information collection server via a communication network. In addition, the data collection unit 2 may collect information about each device from the information collection server via the communication network.

If each device is equipped with an agent, the data collection unit 2 may collect information about each device via the agent, or it may obtain information about each device from an information collection server that has collected information about each device via the agent.

If an agent installed in each device respectively transmits information about the device to an information collection server. the data collection unit 2 may collect information about each device included in the system to be diagnosed from the information collection server. In this case, for example, the analysis system 1 may be connected to the information collection server via a communication network. In addition, the data collection unit 2 may collect information about each device from that information collection server via the communication network.

When the data collection unit 2 collects information about each device included in the system to be diagnosed, it stores the information in the data storage unit 3.

The data storage unit 3 is a storage device that stores the information about each device collected by the data collection unit 2.

Figure 2:
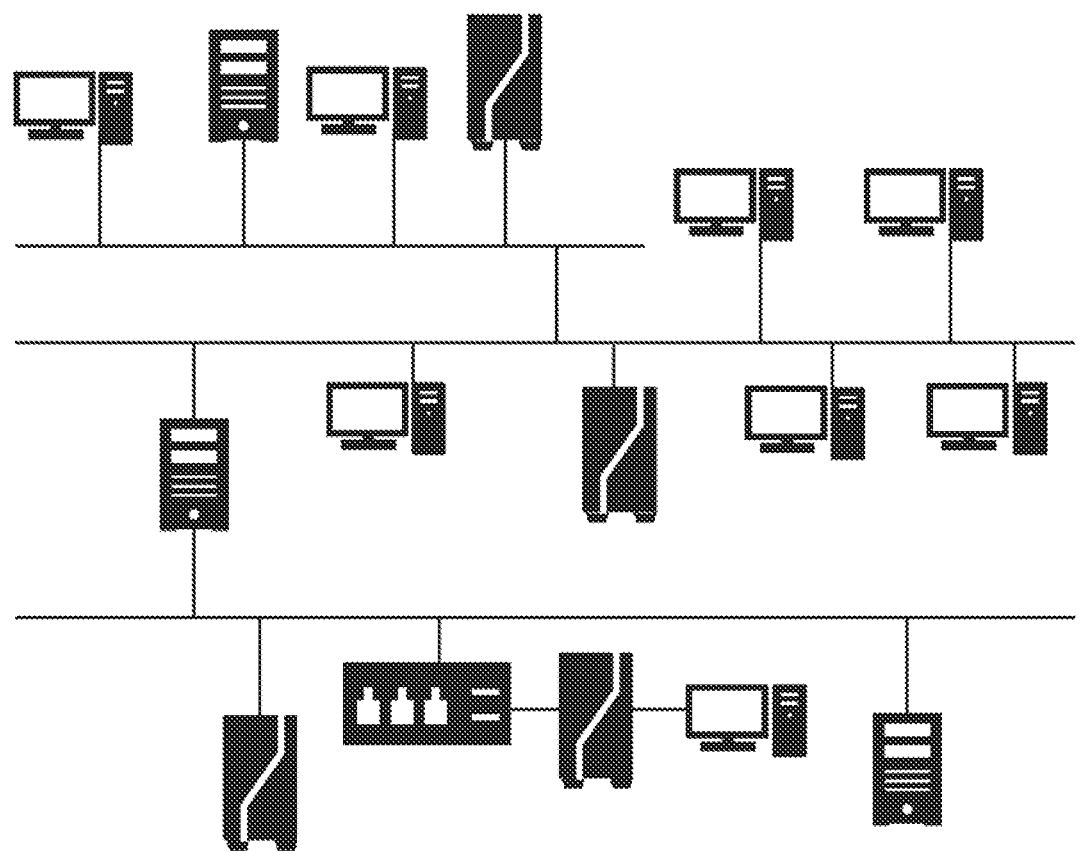
FIG. 2 is a schematic diagram showing an example of a network topology identified by the topology identification unit.

The topology identification unit 4 identifies the network topology of each device. Specifically, the topology identification unit 4 identifies the network topology of each device based on the network topology configuration given by the security administrator (hereinafter referred to simply as the administrator). In addition, the topology identification unit 4 may identify the network topology of each device based on the information about each device stored in the data storage unit 3. FIG. 2 is a schematic diagram showing an example of a network topology identified by the topology identification unit 4. FIG. 2 indicates a situation in which the plurality of devices are connected via a communication network.

The detection unit 5 detects the attack routes in the system to be diagnosed based on the security information about each device stored in the data storage unit 3. Specifically, the security information about the devices includes the security support status of the devices.

The attack route indicates the flow of an attack that can be executed in the system to be diagnosed. Specifically, the attack route is a route that indicates the order of the devices to be attacked, from the device that is the starting point of the attack to the device that is the end point of the attack.

The detection unit 5 may detect the attack route based on the security information about each device and the predefined analysis rules.

For example, the detection unit 5 may detect the attack route using the following method.

There are the plurality of types of attacks. The attacks that a device may be subjected to vary depending on the vulnerabilities it has. Therefore, in each example embodiment of the present invention, the state of a device that may be attacked due to vulnerability is defined as an attack state. For example, an attack state can be defined as "a state in which code can be executed (hereinafter referred to as "exec-Code")", "a state in which data can be tampered with (hereinafter referred to as "dataInject")", "a state in which files can be accessed (hereinafter referred to as "access-File")", "a state in which account information is held (hereinafter referred to as "hasAccount")", "a state in which DoS (Denial of Service) attacks can be performed", etc.

Figure 3:
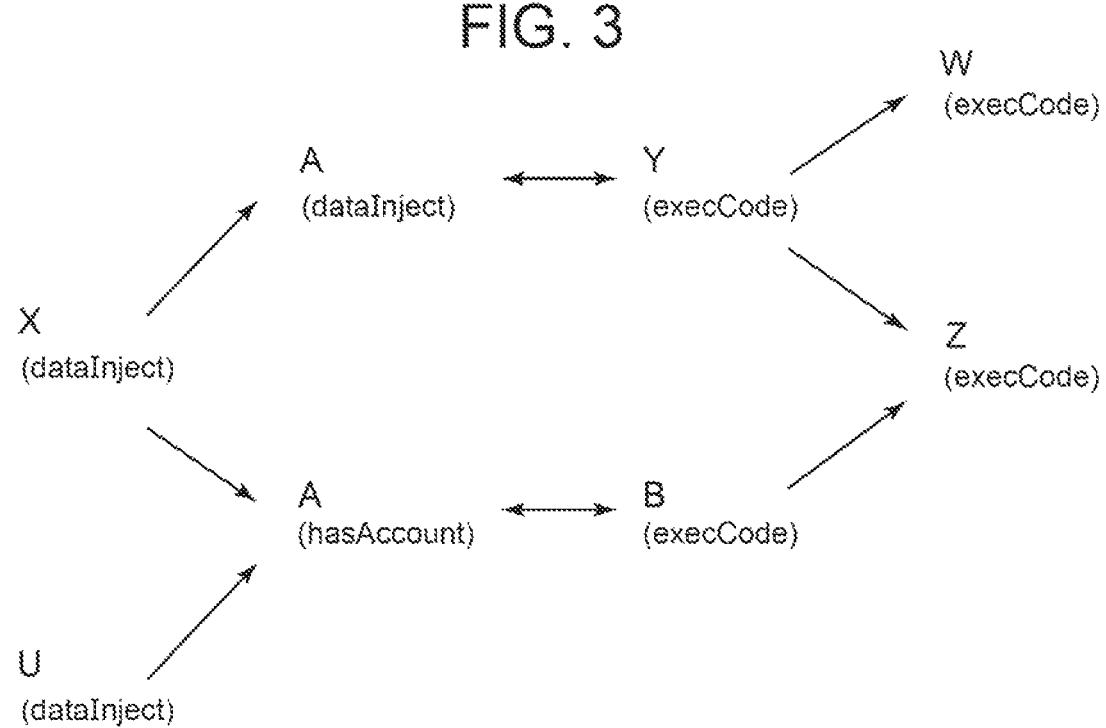
FIG. 3 is a schematic diagram showing an example of information showing the plurality of transition relationships of a "combination of device and attack state".

The information that indicates the transition from one "combination of device and attack state" to another "combination of device and attack state" is called an attack scenario. The transition from one "combination of device and attack state" to another "combination of device and attack state" indicates that one attack becomes possible on one device, and another attack becomes possible on that device or another device. The detection unit 5 detects possible attack scenarios in the system to be diagnosed, based on the security information for each device and the predefined analysis rules. Specifically, the detection unit 5 detects attack scenarios according to whether or not the security information about each device conforms to the conditions indicated by the analysis rules. The detection unit 5 considers the "combination of devices and attack states" as a node in the plurality of detected attack scenarios, and obtains information indicating the plurality of transition relationships of the "combination of devices and attack states" by connecting the common node. FIG. 3 is a schematic diagram showing an example of this information. In FIG. 3, "A", "B", "U", "W", "X", "Y", and "Z" represent devices, respectively. Here, the case, where the information shown in FIG. 3 is obtained, will be explained as an example.

The detection unit 5 accepts the designation of the analysis target from the administrator via the user interface (not shown). The analysis target may be a device that is the starting point of an attack, a device that is the end point of an attack, or a combination of the two. Also, the plurality of analysis targets may be designated. The detection unit 5 detects the attack route based on the information (see FIG. 3) that indicates the plurality of transition relationships of "combination of device and attack state" for the analysis target designated by the administrator.

For example, if the administrator designates a device X as the starting point of the attack and a device Z as the end point of the attack, the detection unit 5 can detect the attack route "X→A→Y→Z" (hereinafter referred to as attack route 1), and the attack route "X→A→B→Z" (hereinafter referred to as attack route 2) based on the information schematically shown in FIG. 3. In this way, even if one starting point and one ending point are designated, the plurality of attack routes may exist.

For example, if the administrator designates a device X as the starting point of the attack and a device W as the end point of the attack, the detection unit 5 can detect the attack route "X→A→Y→W" based on the information schematically shown in FIG. 3.

This method is an example of how the detection unit 5 detects attack routes.

In the above method, even if there are common devices on different attack routes, the attack states of the devices are not necessarily identical. Since a device may have the plurality of vulnerabilities, or a single vulnerability may result in the plurality of attacks, the attack state of the common devices on different attack routes may be different. For example, in the above attack route 1, the attack state of device A is "dataInject". In addition, in the above attack route 2, the attack state of device A is "hasAccount" (see FIG. 3).

In addition, the attack route is not always detected for the analysis target designated by the administrator. For example, if an administrator designates a device Z as the starting point of an attack and a device X as the end point of an attack, no attack route will be detected (see FIG. 3). This means that there is no attack from device Z to device X.

When the administrator designates only the starting point, the detection unit 5 may set the important device as the end point. When the administrator designates only the endpoint, the detection unit 5 may set a predetermined terminal that has a high possibility of being the starting point as the starting point.

Here, the important device is a device that is important in the system to be diagnosed and that is undesirable to be attacked. The administrator may decide in advance what types of devices are considered important devices. For example, an account server that holds the plurality of account information (set of ID and password) is decided as an important device. Also, devices other than account servers may be decided as important devices. For example, the administrator may consider a storage device that stores confidential information as an important device. Also, there may be more than one type of device that corresponds to an important device, and one system may have more than one device that corresponds to an important device.

The evaluation value derivation unit 6 derives an evaluation value that indicates the degree of risk from an attack on an attack route based on the information about the devices on the attack route and the information stored in the risk information storage unit 7. The evaluation value derivation unit 6 derives the evaluation value for each attack route.

The information stored in the risk information storage unit 7 is explained. FIG. 4 is a schematic diagram showing an example of information stored in the risk information storage unit 7.

The relationship between various types of software and various types of security vulnerabilities is predetermined. The risk information storage unit 7 stores the information indicating the relationship between various software and various vulnerabilities in a table format, for example (see the table shown in the upper part of FIG. 4). The table indicating the relationship between the software and the vulnerabilities is hereinafter referred to as the first table. The administrator may store the first table in the risk information storage unit 7 in advance.

There are two main types of security vulnerabilities. The first vulnerability is vulnerabilities caused by software or device (routers, etc.) defects. Information on these vulnerabilities is collected and classified by various organizations. Also, the vulnerabilities are numbered accordingly. As an example, in the Common Vulnerabilities and Exposures (CVE), an identifier of the form "CVE-**-**" is assigned to the discovered vulnerability. The second vulnerability is the vulnerability caused by the protocol specification. Examples of such vulnerabilities are "abuse of FTP (File Transfer Protocol)", "abuse of Telnet", etc. In each example embodiment of the present invention, the vulnerabilities include these first and second vulnerabilities.

For each vulnerability, the risk information storage unit 7 stores the evaluation value that indicates the degree of risk from the attack using the vulnerability, for example, in a table format (see the table shown in the lower part of FIG. 4). The table indicating the relationship between the vulnerability and the evaluation value is hereinafter referred to as the second table.

The evaluation values stored in the second table may be set for each vulnerability in advance. For example, if the vulnerability is a software or device vulnerability, the risk value in CVSS v3 (Common Vulnerability Scoring System v3) set for the vulnerability may be used as the evaluation value. CVSS v3 also includes information such as "Access Complexity," "Access Vector," "Availability Impact," and "Exploitability". Depending on these values, the risk value may be corrected and used as the evaluation value. In addition, the risk value in CVSS v3 may be used as the evaluation value by correcting the risk value according to information such as "whether the vulnerability has been discovered recently" or "whether the vulnerability has been attacked frequently recently". The value itself computed based on information such as "whether the vulnerability has been discovered recently" or "whether the vulnerability has been attacked frequently recently" may also be used as one of the evaluation values.

The administrator may set a relatively large evaluation value for vulnerabilities that have a large impact, such as contributing to reaching personal information, or that are the cause of prevalent attacks.

In the case of vulnerabilities caused by protocol specifications, such as "Abuse of FTP," "Abuse of Telnet," etc., the administrator may predetermine the evaluation value as appropriate.

As in the above example, the administrator may define the evaluation value in advance for each vulnerability and store the second table in the risk information storage unit 7.

An example of how the evaluation value derivation unit 6 derives the evaluation value for one attack route is explained below. For each device on the attack route of interest, the evaluation value derivation unit 6 checks each software installed on the device and determines each vulnerability corresponding to each software installed on the device by referring to the first table (see FIG. 4) stored in the risk information storage unit 7. In addition, the evaluation value derivation unit 6 identifies the vulnerability according to the attack route from among the determined vulnerabilities, for each device on the attack route of interest. As already explained, even if there are common devices on different attack routes, the attack states of those devices are not necessarily identical. Therefore, as described above, the evaluation value derivation unit 6 identifies the vulnerability according to the attack route.

After the evaluation value derivation unit 6 identifies a vulnerability for each device on the attack route of interest, the evaluation value derivation unit 6 reads the evaluation value corresponding to the vulnerability for each device from the second table (see FIG. 4). Then, the evaluation value derivation unit 6 derives the evaluation value of the attack route of interest, based on the evaluation values obtained for each device on the attack route. For example, the evaluation value derivation unit 6 may use the sum of the evaluation values obtained for each device on the attack route as the evaluation value of the attack route. Also, for example, the evaluation value derivation unit 6 may use the maximum value of the evaluation values obtained for each device on the attack route as the evaluation value of the attack route.

When the attack route includes important devices, especially when the end point of the attack route is an important device, the evaluation value derivation unit 6 may use the sum of the evaluation values obtained for each device on the attack route, multiplied or added by a predetermined value, as the evaluation value for that attack route. The evaluation value derivation unit 6 may derive an evaluation value for each attack route using the method described above.

Another example of how to compute the evaluation value is described below. For each vulnerability, the evaluation value derivation unit 6 computes how many attack patterns the vulnerability is used in the system to be diagnosed, and the result of the computation may be defined as the evaluation value of the vulnerability. Here, the attack pattern is the information that includes at least an attack state that is attack condition, an attack state that is attack result, and the vulnerability used in the attack. Then, as described above, the evaluation value derivation unit 6 identifies the vulnerability according to the attack route for each device on the attack route of interest. The evaluation value derivation unit 6 uses the number of attack patterns that use the vulnerability as the evaluation value of the vulnerability identified for each device. In this way, after obtaining the evaluation value for each device on the attack route, the evaluation value derivation unit 6 derives the evaluation value of the attack route of interest based on the evaluation value obtained for each device. For example, the evaluation value derivation unit 6 may use the sum of the evaluation values obtained for each device on the attack route as the evaluation value of the attack route. Also, for example, the evaluation value derivation unit 6 may use the maximum value of the evaluation values obtained for each device on the attack route as the evaluation value of the attack route. The evaluation value derivation unit 6 may use this method to derive the evaluation value for each attack route.

The damage information storage unit 8 is a storage device that stores damage information (information that indicates the content of damage suffered when attacked) according to the function of the device.

FIG. 5 is a schematic diagram showing an example of information stored in the damage information storage unit 8. For example, the damage information storage unit 8 stores a table that associates the function of the device, the attack type, and the damage information, as illustrated in FIG. 5. The attack type is identified by identifying the function of the device.

The damage identification unit 9 identifies the damage information for each device on the attack route. The damage identification unit 9 performs this process for each attack route. However, there may be devices on the attack route for which no damage information is identified.

The following is an example of how the damage identification unit 9 identifies damage information for each device of one attack route. The damage identification unit 9 identifies the vulnerability and the function of the device for each device of the attack route of interest.

The method of identifying vulnerabilities of devices is the same as the method of identifying vulnerabilities of devices by the evaluation value derivation unit 6. That is, for each device on the attack route of interest, the damage identification unit 9 checks each software installed in the device and, by referring to the first table (see FIG. 4), determines each vulnerability corresponding to each software installed in the device. Furthermore, the damage identification unit 9 identifies, for each device on the attack route of interest, the vulnerability according to the attack route from among the vulnerabilities that have been determined.

The damage identification unit 9, for example, identifies the function of each device as follows.

The conditions according to the function of the device are defined in advance. For example, for the "account server function", one, two or more of the following conditions are predetermined: "software for the account server is installed", "the device exchanges communication data with other devices using a predetermined protocol", or "a predetermined port is open".

For example, for the "human resources information management server function", the condition that "software for the human resources information management server is installed" is predetermined.

The damage identification unit 9 may identify the function of the device by referring to the information about the device whose function is to be identified and determining whether the information satisfies the conditions corresponding to any function. If the information about the device does not meet the conditions for any of the functions, the damage identification unit 9 may derive the result "No applicable function" as the function of the device.

Using the method described above, the damage identification unit 9 identifies the function of each device on the attack route of interest.

However, the damage identification unit 9 may identify the functions of devices in other ways. For example, the damage identification unit 9 may identify the function of each device on the attack route by receiving the designation of the function of each device on the attack route from the administrator via a user interface (not shown).

Once the damage identification unit 9 has identified the vulnerability and function of one device on the attack route of interest, it searches for records matching that function from the table stored by the damage information storage unit 8 (see FIG. 5). If there is a record that matches the function, the damage identification unit 9 reads the damage information included in that record and identifies the read damage information as the damage information for that device. If there is no corresponding record, the damage identification unit 9 determines that there is no damage information for that device. The damage identification unit 9 performs this operation for each device on the attack route of interest. As a result, damage information is determined for each device on the attack route of interest.

The damage identification unit 9 performs the same operation as above for each attack route, and identifies damage information for each device on each attack route. However, as mentioned above, there may be devices for which no damage information is identified.

The above explanation shows a case in which the damage identification unit 9 determines damage information based on the function of the device. In other cases, the damage identification unit 9 may determine damage information based on the function of the device and the vulnerability of the device, or based on the type of attack, etc. Furthermore, the damage identification unit 9 may identify damage information based on a set of the function of the device and attack states.

The countermeasure identification unit 10 of this example embodiment outputs the relationship between damage and cost in the system to be diagnosed based on the damage information of each device on each attack route, the countermeasures against the damage indicated by the damage information, and the cost required to implement the countermeasures.

The countermeasure identification unit 10 computes the cost required for countermeasures for one attack route as a whole. When computing the cost, the countermeasure identification unit 10 uses the countermeasure information shown in FIG. 6. FIG. 6 is a schematic diagram showing an example of information stored in the countermeasure information storage unit 11.

The countermeasure information shown in FIG. 6 consists of damage information, countermeasure plans, and costs. The damage information shown in FIG. 6 is the damage information shown in FIG. 5. The countermeasure plan shown in FIG. 6 is a plan for countermeasures against the damage indicated by the damage information. The cost shown in FIG. 6 is the cost required to implement the countermeasure plan.

The countermeasure identification unit 10 selects the countermeasure plan based on various criteria. For example, the countermeasure identification unit 10 selects the countermeasure plan with the lowest cost. In the example shown in FIG. 6, the countermeasure identification unit 10 selects the countermeasure plan "awareness raising to members of the department" for both the damage information "leakage of account information" and "leakage of personnel information". The countermeasure plan "awareness raising to members of the department" is a low-cost countermeasure because it simply alerts the members of the department by e-mail, etc.

The countermeasure identification unit 10 may select the countermeasure plan that has the largest sum of costs within the budget designated by the customer. For example, if the designated budget is "20," the countermeasure identification unit 10 selects the countermeasure plan "improving the security level of firewalls" that has the largest sum of costs within the budget ("16") for both the damage information "leakage of account information" and "leakage of personnel information". The more the countermeasure identification unit 10 selects the countermeasure plan with the larger sum of costs, the more effective countermeasures the administrator can take.

The countermeasure identification unit 10 may also select a countermeasure plan according to whether it is a permanent countermeasure or a provisional countermeasure. Although not shown in the figure, for example, the countermeasure information shown in FIG. 6 may further include information indicating whether each countermeasure plan is a "permanent countermeasure" or a "provisional countermeasure".

Specifically, information indicating "permanent countermeasure" is associated with the countermeasure plan "applying the patch". The countermeasure plan "improving the security level of firewalls" is associated with information indicating "provisional countermeasure". The evaluation value derivation unit 6 may again derive the evaluation value so that the derived evaluation value is increased by a predetermined percentage according to whether each countermeasure plan is a "permanent countermeasure" or a "provisional countermeasure".

The countermeasure identification unit 10 may also select the countermeasure plan according to operational constraints (e.g., the preferred period during which system changes are to be avoided, etc.). The countermeasure plan identified by the countermeasure identification unit 10 becomes the countermeasure plan to prevent the attack indicated by the attack route. The countermeasure identification unit 10 also identifies the cost required to implement the countermeasure plan identified above.

If the patch used in the countermeasure plan is a patch that has just been distributed, the countermeasure identification unit 10 may exclude the countermeasure plan "applying the patch" because there is a possibility that the patch is defective or that the system to be diagnosed may not operate properly after the patch is applied. For the same reason, the evaluation value derivation unit 6 may re-derive the evaluation value so that the derived evaluation value is increased by a predetermined percentage when the patch used in the countermeasure plan is a patch that has just been distributed.

Figure 7:
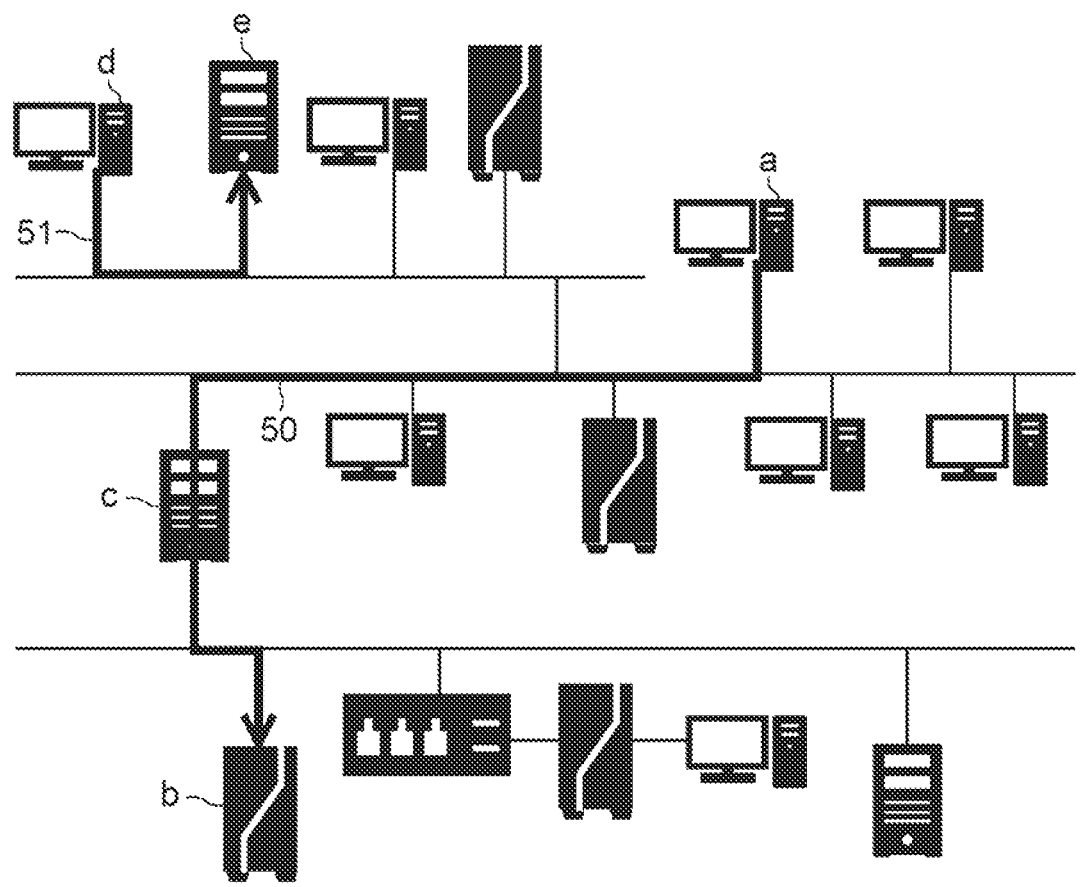
FIG. 7 is a schematic diagram showing a display example of the attack route in the first example embodiment.

The display control unit 12 displays the attack routes on the display device 13 by superimposing them on the network topology identified by the topology identification unit 4. FIG. 7 is a schematic diagram showing a display example of the attack route in the first example embodiment.

In the example shown in FIG. 7, the display control unit 12 displays the attack route "device a→device c→device b" (hereinafter referred to as attack route 50, denoted by the sign "50"). The display control unit 12 also displays the attack route "device d→device e" (hereinafter referred to as attack route 51, denoted by the sign "51").

The display device 13 is a device that displays information, and can be a general display device. If the analysis system 1 exists in the cloud, the display device 13 may be such as a display device of a terminal connected to the cloud.

Figure 8:
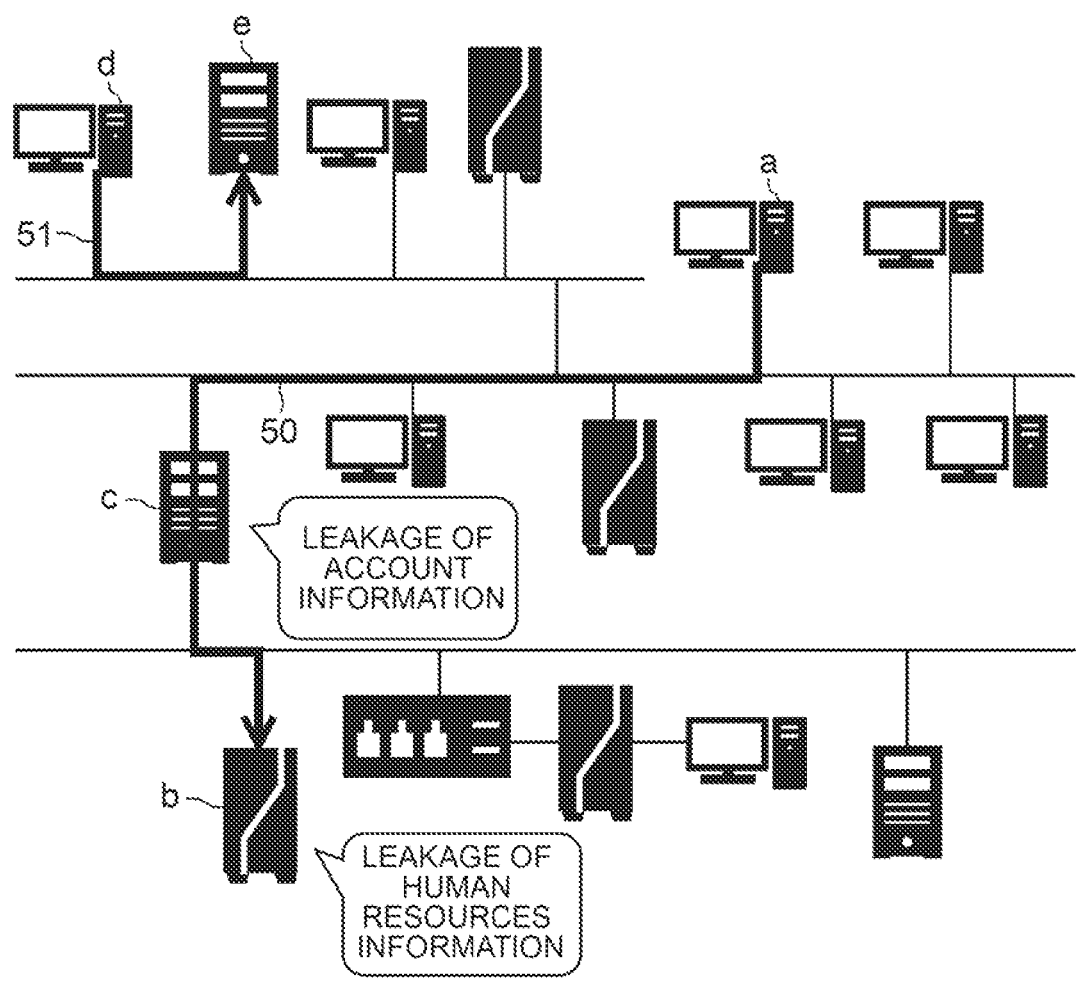
FIG. 8 is a schematic diagram showing another display example of the attack route in the first example embodiment.

In addition to displaying each attack route, the display control unit 12 may also display damage information (i.e., information that indicates content of damage of devices when the devices are attacked) in the vicinity of the device for which the damage information has been identified. FIG. 8 is a schematic diagram showing another display example of the attack route in the first example embodiment.

In the example shown in FIG. 8, damage information is identified for the devices c, b on the aforementioned attack route 50, respectively, and the display control unit 12 displays the corresponding damage information in the vicinity of the devices c and b, respectively, on the display device 13. Here, the display control unit 12 may display each attack route as well as information on security such as the vulnerability of the device in the vicinity of the device.

The display control unit 12 may change the size and color of the text and pop-ups according to the magnitude of the content of damage indicated by the damage information. For example, the content of the damage information may be ranked in advance, and the display control unit 12 may set the size and color of the text and pop-ups according to the rank when displaying the damage information.

The display format of damage information is not limited to the above example. For example, the display control unit 12 may display an icon near the device for which damage information has been identified, indicating that damage information is related to that device. When the icon is clicked by a mouse and the like, the display control unit 12 may display the damage information about the device. Alternatively, the display control unit 12 may display damage information about the device when the icon is in mouse-over state (rollover). The display control unit 12 may also display damage information in a pop-up window and change the size of the pop-up window according to the operation by the mouse and the like.

Figure 9:
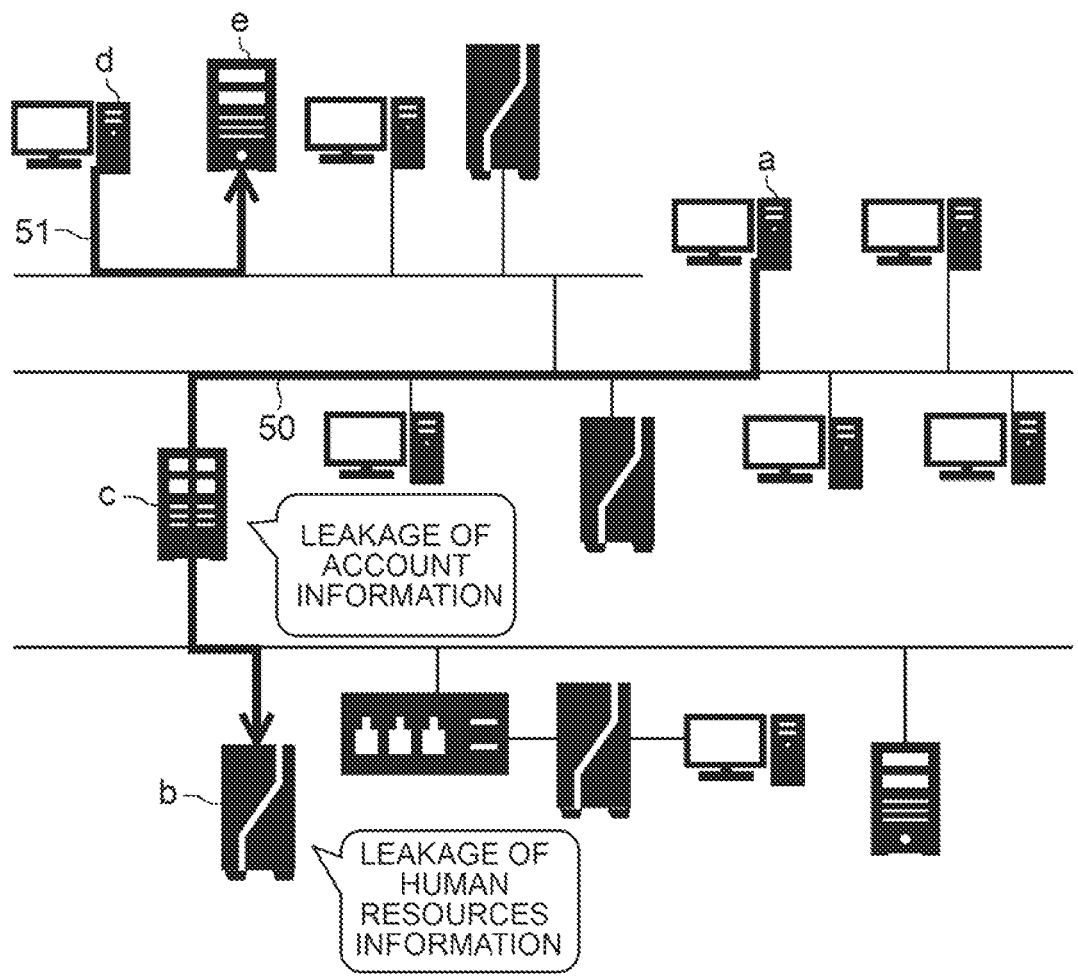
FIG. 9 is a schematic diagram showing another display example of the attack route in the first example embodiment.

In addition to displaying each attack route and damage information, the display control unit 12 may also display the evaluation value of the attack route, the countermeasure plan for the attack route, and its cost. FIG. 9 is a schematic diagram showing another display example of the attack route in the first example embodiment.

As shown in FIG. 9, the display control unit 12 displays the evaluation value of the attack route input from the evaluation value derivation unit 6 at the bottom of the dashed line, the countermeasure plans to the attack routes input from the countermeasure identification unit 10, and its cost. The contents shown in FIG. 9 are the contents displayed on the same screen.

As shown in FIG. 9, each evaluation value for attack routes 50 and 51 are "13" and "7", respectively. The display control unit 12 may display each attack route in ascending or descending order of the evaluation values.

In addition, as shown in FIG. 9, as a countermeasure plan against the attack route 50, a plan to "awareness raising to members of the department" for both devices b and c and plans to "applying the patch" to device b and "awareness raising to members of the department" to device c are displayed. As shown in FIG. 9, the cost of each countermeasure plan is "4" and "6" respectively.

The display control unit 12 may display each countermeasure plan in ascending or descending order of cost. Based on the displayed content shown in FIG. 9, the administrator can, for example, select the countermeasure plan with the smallest cost. The administrator can also select the countermeasure plan with the largest cost within the budget designated by the customer, for example. The administrator can also select the countermeasure plan with the largest evaluation value within a predetermined cost range.

The administrator may also determine, for example, that priority countermeasures are to be implemented for the attack route with the largest evaluation value. The administrator may also determine which attack routes that countermeasures are preferentially implemented based on other criteria. For example, the administrator may determine that countermeasures are preferentially implemented for attack routes that include important devices.

The countermeasure information shown in FIG. 6 may include information indicating the time required to implement the countermeasure plan. If the information indicating the time is included, the display control unit 12 may display the information indicating the time along with the countermeasure plan.

When a predetermined countermeasure plan is selected, the display control unit 12 may not display the attack route that will be eliminated by the implementation of the selected countermeasure plan. Specifically, when one of the countermeasure plans displayed at the bottom of the dashed line in FIG. 9 is selected, the display control unit 12 may erase the corresponding attack route displayed at the top of the dashed line.

When the cursor hovers over one of the countermeasure plans displayed at the bottom of the dashed line in FIG. 9, resulting in a mouse-over condition, the display control unit 12 may erase the corresponding attack route displayed at the top of the dashed line.

If a countermeasure plan is selected for one attack route, as described above, and if common devices exist in other attack routes and the common countermeasure plan is effective, the display control unit 12 does not display the attack route where the common devices exist.

The above process makes it possible to easily understand the attack routes that will be eliminated when a countermeasure plan is implemented for a certain attack route. Furthermore, it is easy to understand the impact on other attack routes, i.e., how many attack routes can be eliminated according to the countermeasure plan implemented.

The data collection unit 2 is realized, for example, by a CPU (Central Processing Unit) of a computer that operates according to an analysis program and a communication interface of the computer. For example, the CPU may read the analysis program from a program recording medium such as a program storage device of the computer, and operate as the data collection unit 2 according to the program and using the communication interface of the computer. The topology identification unit 4, the detection unit 5, the evaluation value derivation unit 6, the damage identification unit 9, the countermeasure identification unit 10, and the display control unit 12 are realized, for example, by the CPU of the computer operating according to the analysis program. For example, the CPU may read an analysis program from a program recording medium as described above, and operate as the topology identification unit 4, the detection unit 5, the evaluation value derivation unit 6, the damage identification unit 9, the countermeasure identification unit 10, and the display control unit 12 according to the program. The data storage unit 3, the risk information storage unit 7, the damage information storage unit 8, and the countermeasure information storage unit 11 are realized, for example, by a storage device included in the computer.

Figure 10:
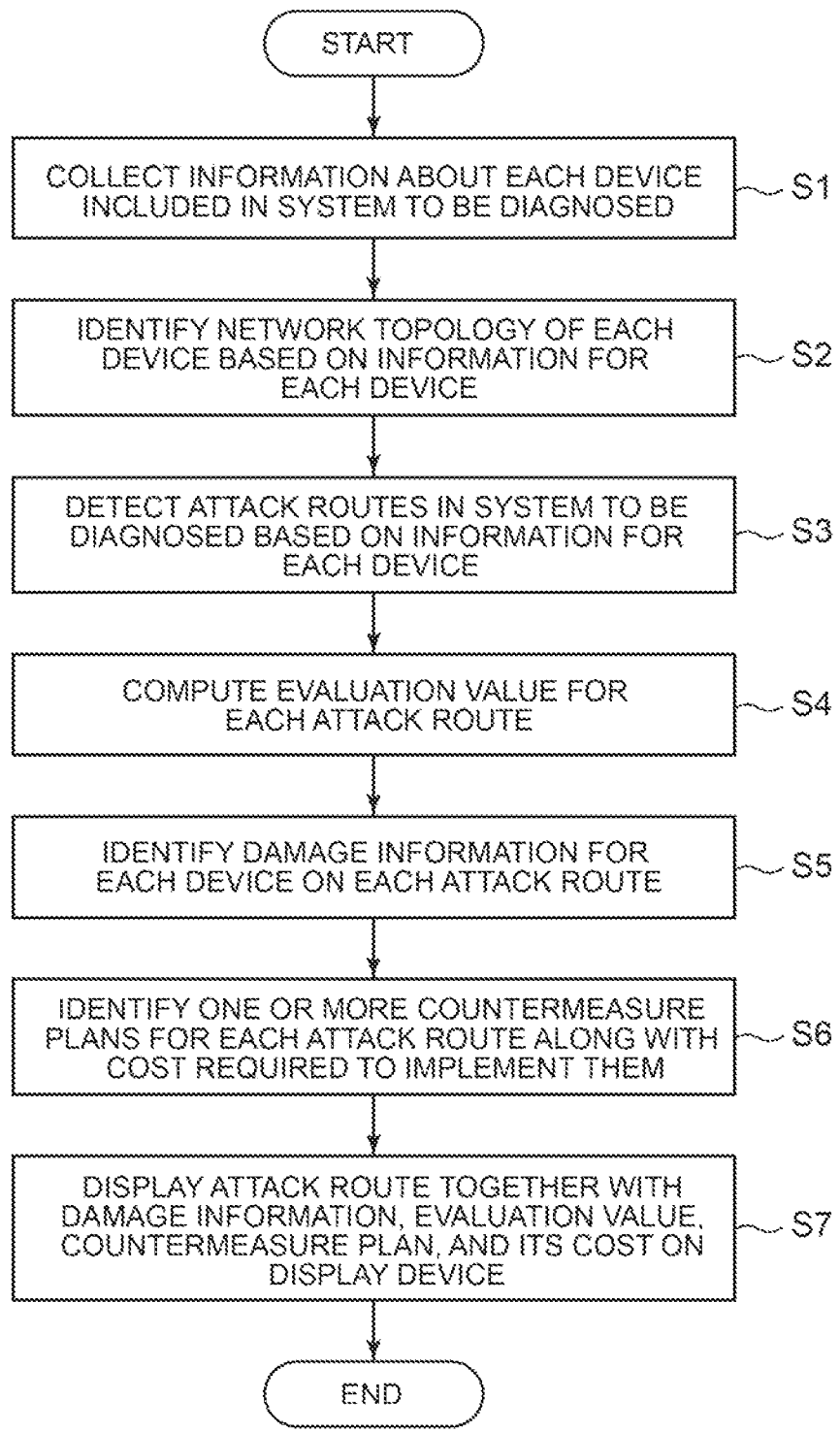
FIG. 10 is a flowchart showing an example of the processing process of the analysis system of the first example embodiment.

Next, the processing process will be explained. FIG. 10 is a flowchart showing an example of the processing process of the analysis system 1 of the first example embodiment. The matters already explained are omitted.

First, the data collection unit 2 collects information about each device included in the system to be diagnosed (Step S1). The data collection unit 2 stores the collected information in the data storage unit 3.

Next, the topology identification unit 4 identifies the network topology of each device (Step S2).

Next, the detection unit 5 detects the attack routes in the system to be diagnosed based on the security information for each device (Step S3).

Next, the evaluation value derivation unit 6 computes evaluation values for each attack route detected in Step S3 (Step S4).

Next, the damage identification unit 9 identifies damage information for each device on each attack route detected in Step S3 (Step S5).

Next, the countermeasure identification unit 10 identifies one or more countermeasure plans for each attack route based on the damage information identified in Step S5, along with the cost required to implement them (Step S6).

Next, the display control unit 12 superimposes the network topology and displays the attack route detected in Step S3 on the display device 13 together with the damage information identified in Step S5. When displaying the attack route, the display control unit 12 also displays on the same screen the evaluation value computed in Step S4 and the countermeasure plan identified in Step S6 and its cost (Step S7).

According to this example embodiment, as described above, the display control unit 12 displays one or more countermeasure plans for the attack route on the display device 13, along with the cost required to implement them. Thus, the administrator can easily select a countermeasure plan for the attack route in consideration of cost.

The evaluated value of the attack route is also displayed on the display device 13, allowing the administrator to select the attack route that is most effective when countermeasures are implemented.

When the countermeasure plan for the attack route is selected, the attack route displayed on the display device 13 disappears, further the attack route that is eliminated by the selected countermeasure plan disappears together, so that the administrator can easily grasp the most effective countermeasure.

Example Embodiment 2

Figure 11:
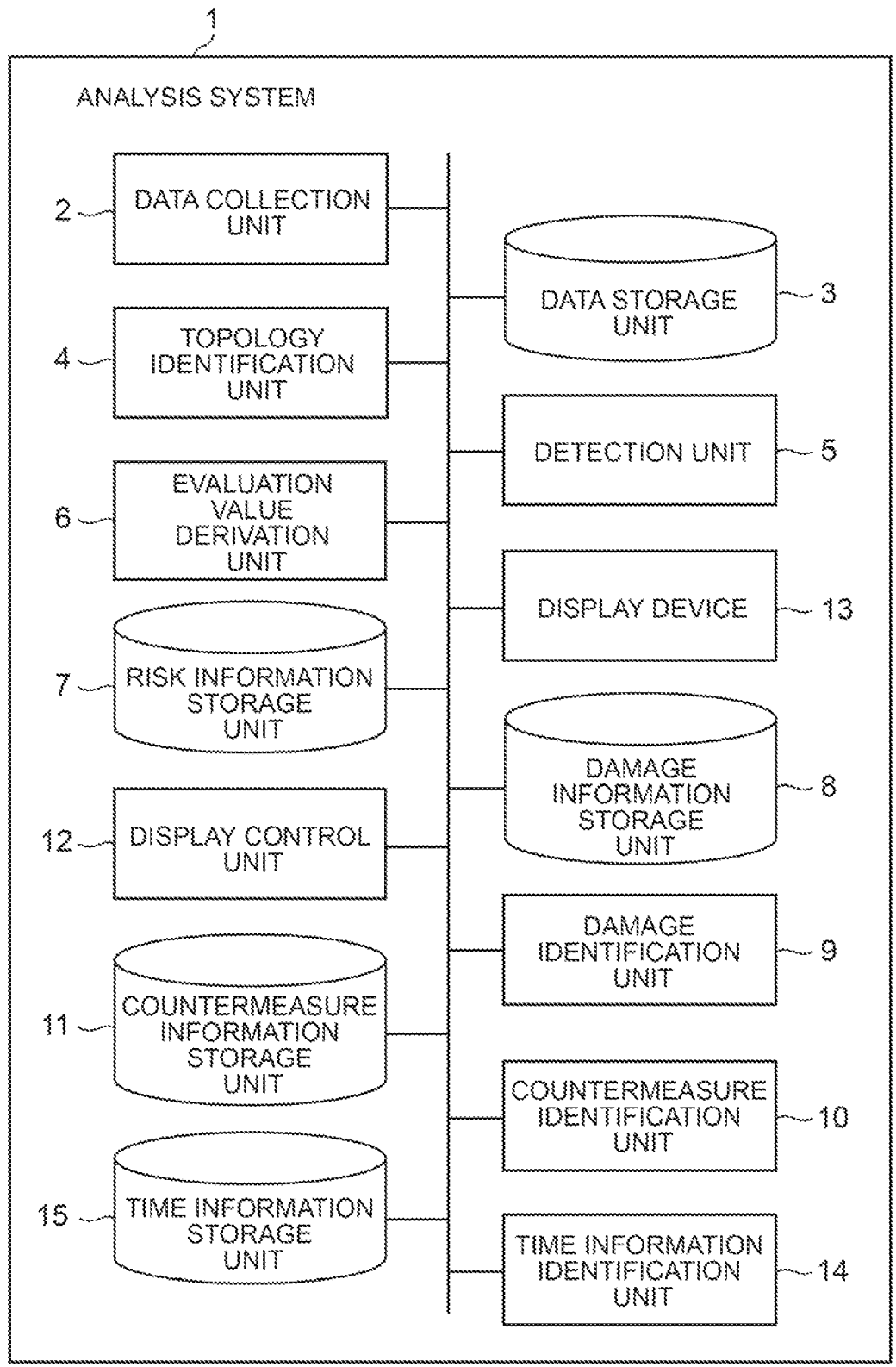
FIG. 11 is a block diagram showing an example of the analysis system of the second example embodiment of the present invention.

FIG. 11 is a block diagram showing an example of the analysis system of the second example embodiment of the present invention. Elements similar to those of the first example embodiment are marked with the same signs as in FIG. 1. The analysis system 1 of the second example embodiment includes a data collection unit 2, a data storage unit 3, a topology identification unit 4, a detection unit 5, an evaluation value derivation unit 6, a risk information storage unit 7, a damage information storage unit 8, a damage identification unit 9, a countermeasure identification unit 10, a countermeasure information storage unit 11, a display control unit 12, a display device 13, a time information identification unit 14, and a time information storage unit 15.

The data collection unit 2, the data storage unit 3, the topology identification unit 4, the detection unit 5, the evaluation value derivation unit 6, the risk information storage unit 7, the damage information storage unit 8, the damage identification unit 9, the countermeasure identification unit 10, the countermeasure information storage unit 11, the display control unit 12, and the display device 13 are the same as those elements in the first example embodiment and will not be described.

By referring to the information collected from the devices and the information stored in the time information storage unit 15, the time information identification unit 14 identifies the time information that represents the degree of time required to attack on the devices, for each device on each attack route. The operation of the time information identification unit 14 to identify the time information for each device is described below.

The time information may be information representing the time required to attack on the device itself. The time required to attack on the device may be an approximate value. The time information may also be information representing, relatively, the time required to attack on the device. The information representing, relatively, the time required to attack on the device may be labeled as "long time," "medium time," "short time," etc. In the following explanation, the case, where a numerical value representing the time required to attack on the device is used as the time information, will be an example.

In other words, the time information represents the degree of speed of the attack.

The time information storage unit 15 is a storage device that stores information used by the time information identification unit 14 to identify the time information for each device.

The time information storage unit 15 stores time information defined according to the type of vulnerability, or the type of vulnerability, device and device settings (in the example shown below, the settings related to authentication), for example, in the table format illustrated in FIG. 12.

FIG. 12 is a schematic diagram showing an example of a table that stores predetermined time information according to the type of vulnerability, or the type of vulnerability, device and device settings. The time information storage unit 15 stores the table illustrated in FIG. 12. As mentioned above, the case where a numerical value representing the time required to attack a device is used as the time information is taken as an example.

In the example shown in FIG. 12, "Authentication (Authentication required before attack)", "Presence of attack tools", "Access Vector", and "Access Complexity" are predetermined for software and device vulnerabilities. The "Authentication", "Access Vector", and "Access Complexity" can be determined from the evaluation conducted by the CVSS v3 for each vulnerability. In other words, by referring to the results of the CVSS v3 assessment for each vulnerability, the administrator can know the "Authentication", "Access Vector", and "Access Complexity".

There are three categories of "Authentication": "multiple (more than one authentication is required before attack)," "single (authentication is required before attack)," and "unnecessary (authentication is not required before attack).

An attack tool is a tool that is used to attack vulnerabilities. An example of an attack tool is a hacking tool such as an exploit kit distributed on the dark web.

The "Access Vector" indicates "from where the attack is possible. For example, if the "Access Vector" is "local", it means that the attack must be done from a local environment, such as via USB (Universal Serial Bus). For example, if the "Access Vector" is "network", it means that an attack from a remote location is possible.

The "Access Complexity" is the complexity of the attack conditions and is divided into three categories: "high," "medium," and "low".

The administrator predetermines the time information (the degree of time required to attack the vulnerability) of the software or device vulnerability according to the "device", "Authentication", "Presence of attack tools", "Access Vector", and "Access Complexity". For example, in "CVE-2016-8*88" illustrated in FIG. 12, the "device" is "router", the "Authentication" is "unnecessary", the attack tool exists, the "Access Vector" is "network", and the "Access Complexity" is "low". Based on these factors, the administrator can predetermine the time information for "CVE-2016-8*88."

Furthermore, for vulnerabilities where the "Authentication" is "single" or "multiple", the time information is determined by the administrator according to the combination of various settings related to authentication predetermined by the administrator, such as the "number of characters in password", "lockout period" and "authentication interval". For example, in the example shown in FIG. 12, for "CVE-2017-9*99", the "device" is "server", the "Authentication" is "single", there is no attack tool, the "Access Vector" is "local", and the "Access Complexity" is "high". However, the settings related to authentication (in this example, the number of characters in the password, lockout period, and authentication interval) vary depending on the settings of each device. Therefore, for "CVE-2017-9*99", the administrator shall determine various combinations of the number of characters in the password, lockout period, and authentication interval to be set for each device. Then, in addition to the fact that the "device" is "server", the "Authentication" is "single", there is no attack tool, the "Access Vector" is "local", and the "Access Complexity" is "high," the administrator also considers the plurality of settings related to authentication for each device, and may predetermine the time information according to the combination of settings for authentication. Therefore, in the table illustrated in FIG. 12, there are the plurality of records for "CVE-2017-9*99" according to the plurality of settings for devices and authentication.

Here, if authentication is required at the time of attack, the attacker will conduct a time-consuming attack such as a brute force attack. Therefore, the administrator may increase the value of the time information when authentication is required during an attack, and decrease the value of the time information when authentication is not required.

Also, the more characters in the password, the more time the attacker needs to attack. Therefore, the administrator may increase the value of the time information as the number of characters in the password increases, and decrease the value of the time information as the number of characters in the password decreases.

Also, the longer the lockout period, the more time the attacker needs to attack. Therefore, the administrator may increase the value of the time information the longer the lockout period is, and decrease the value of the time information the shorter the lockout period is. The same applies to the authentication interval. The fact that the lockout period is 0 seconds means that no lockout has been set. Similarly, an authentication interval of 0 seconds means that no authentication interval has been set.

Also, when an attack tool is present, it becomes easier for an attacker to attack. Therefore, the administrator may decrease the value of the time information when the attack tool is present, and increase the value of the time information when the attack tool is not present.

Also, when the "Access Vector" is "local", it is harder for an attacker to attack. Therefore, the administrator may increase the value of the time information when the "Access Vector" is "local" and decrease the value of the time information when the "Access Vector" is not "local".

The administrator may also increase the value of the time information if the "Access Complexity" is "high", set the value of the time information to medium if the "Access Complexity" is "medium", and decrease the value of the time information if the "Access Complexity" is "low".

In the example shown in FIG. 12, the administrator sets the time information for vulnerabilities caused by the protocol specification. For example, in the example shown in FIG. 12, "10" is set as the time information for "abuse of FTP" and "abuse of Telnet", respectively. However, the time information for vulnerabilities caused by protocol specifications is not limited to the above example.

As described above, the administrator determines the time information for the vulnerability in advance, and stores a table (e.g., the table illustrated in FIG. 12) indicating the correspondence between the type of vulnerability, or the type of vulnerability, the device and device settings (settings related to authentication), and the time information, in the time information storage unit 15.

The time information identification unit 14 identifies the time information for each device on each attack route. How the time information identification unit 14 identifies the time information of a single device on a single attack route is described below.

The time information identification unit 14 determines each vulnerability corresponding to each software installed in the device of interest, by referring to the information collected from the device of interest, checking each software installed in the device, and referring to the first table (see FIG. 4) stored in the risk information storage unit 7. Furthermore, the time information identification unit 14 identifies the vulnerability according to the attack route from among the determined vulnerabilities. As already explained, even if there are common devices on different attack routes, the attack states of the devices are not necessarily the identical. Therefore, as described above, the time information identification unit 14 identifies the vulnerability according to the attack route with respect to the device of interest.

Next, the time information identification unit 14 matches the above vulnerability that is identified, the device of interest, the collected information of the device of interest (lockout setting, lockout period if lockout is set, authentication interval setting during authentication, authentication interval if authentication interval is set, password policy) with the table shown in FIG. 12 stored in the time information storage unit 15. The time information corresponding to the vulnerability, the device of interest, and the information collected from the device of interest is read from the table shown in FIG. 12. The password policy specifies the number of characters in the password. If the time information can be identified only from the vulnerability, the time information identification unit 14 does not need to refer to the information collected from the device of interest.

As described above, the time information identification unit 14 identifies the time information of a single device on a single attack route. By performing this operation for each device on each attack route, the time information identification unit 14 identifies the time information of each device on each attack route.

The countermeasure identification unit 10 of this example embodiment outputs the relationship between damage, time, and cost in the system to be diagnosed based on the damage information of each device on each attack route, the time information of each device, the countermeasures to the damage indicated by the damage information, and the cost required to implement the countermeasures.

The countermeasure identification unit 10 derives the time information of the attack route of interest based on the time information identified for each device on the attack route. For example, the countermeasure identification unit 10 may set the time information indicating the shortest time among the time information obtained for each device on the attack route as the time information for that attack route. The countermeasure identification unit 10 may also set the information indicating the average time of each time indicated by the time information obtained for each device on the attack route as the time information for that attack route.

Figure 13:
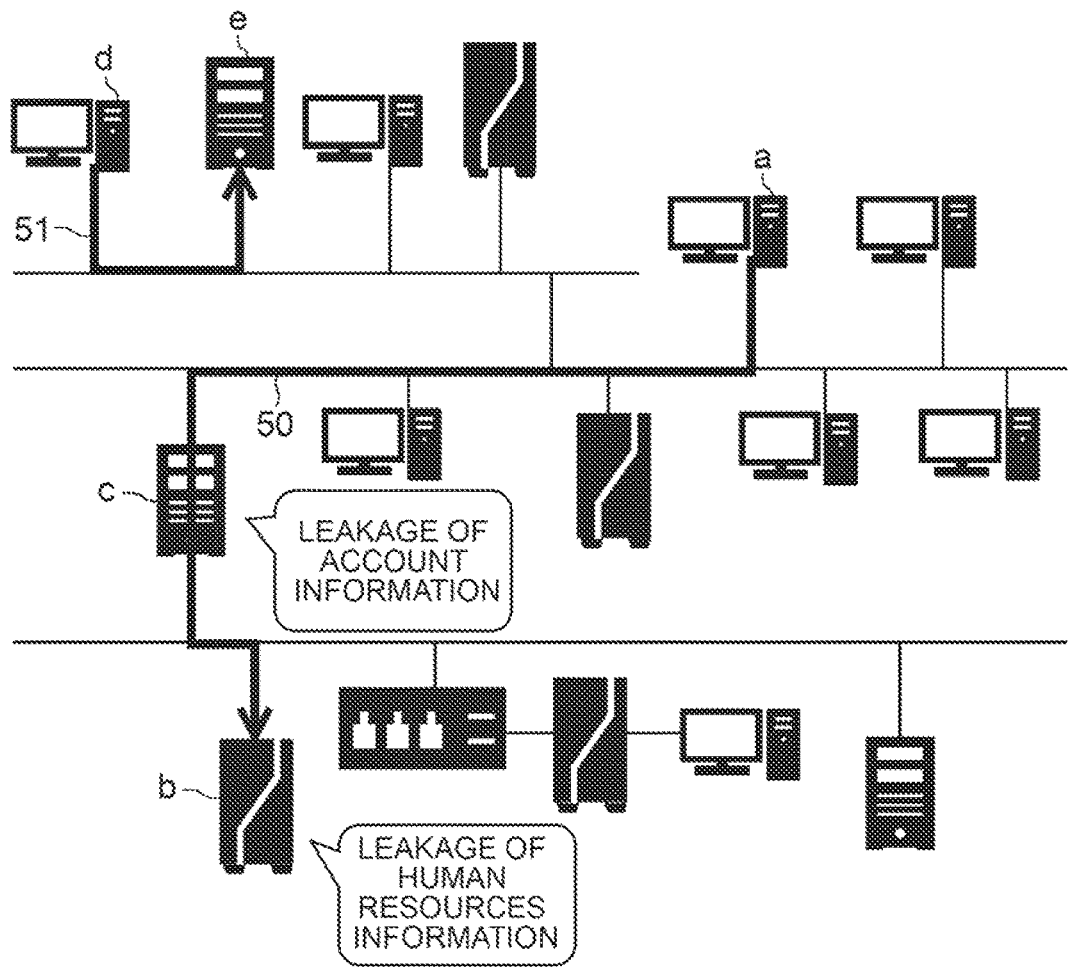
FIG. 13 is a schematic diagram showing a display example of the attack route in the second example embodiment.

The display control unit 12 of this example embodiment displays each attack route and damage information, as well as the evaluation value of the attack route, the time information, the countermeasure plan for the attack route, and its cost. FIG. 13 is a schematic diagram showing a display example of the attack route in the second example embodiment.

As shown in FIG. 13, the display control unit 12 displays the evaluation value of the attack route input from the evaluation value derivation unit 6, the time information input from the countermeasure identification unit 10, the countermeasure plan for the attack route, and its cost at the bottom of the dashed line. The contents shown in FIG. 13 are the contents displayed on the same screen.

As shown in FIG. 13, the time information for attack routes 50 and 51 is "10" and "50", respectively. The time information shown in FIG. 13 is the time information indicating the shortest time among the time information obtained for each device on the attack route. The display control unit 12 may display each attack route in ascending or descending order of the time indicated by the time information.

Although FIG. 13 shows an example of displaying the evaluation value, the time information, and the cost at the bottom of the dashed line, the display control unit 12 may display the evaluation value, the time information, and the cost in the vicinity of the attack route displayed on the network topology at the top of the dashed line.

Based on the displayed contents shown in FIG. 13, the administrator can determine the attack route for which the implementation of countermeasures is required, taking into account the time information in addition to the evaluation value and the cost. For example, if there are multiple attack routes with similar evaluation values and costs, the administrator can determine that countermeasures should be preferentially implemented for the attack route with the shortest time indicated by the time information, i.e., the attack route where the attack is considered to succeed in the shortest time.

For example, there may be attack routes with large evaluation values and costs but large time information values (long time until a successful attack) and attack routes with not so large evaluation values and costs but small time information values (short time until a successful attack). In such a case, the administrator can determine to implement countermeasures against an attack route with a small value of time information, i.e., the attack route that the attack is considered to succeed in a relatively short time, preferentially.

The display control unit 12 may display the time information obtained for each device on the attack route, each of which may be associated with countermeasure plans for each device.

The time information identification unit 14 is realized, for example, by the CPU of the computer operating according to the analysis program. For example, the CPU may read an analysis program from a program recording medium, and operate as the time information identification unit 14 according to the program. The time information storage unit 15 is realized, for example, by a storage device included in the computer.

Figure 14:
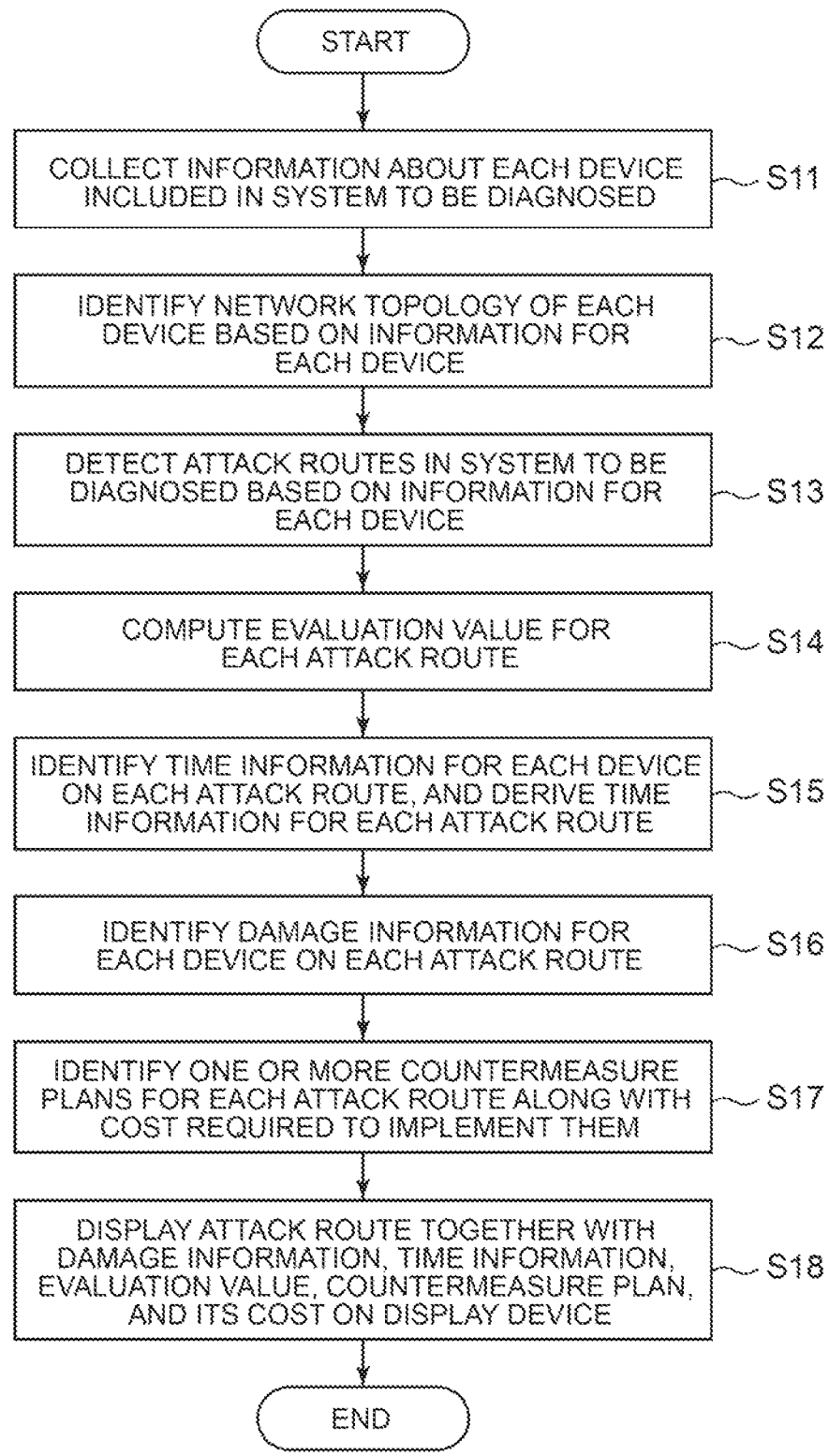
FIG. 14 is a flowchart showing an example of the processing process of the analysis system of the second example embodiment.

Next, the processing process will be explained. FIG. 14 is a flowchart showing an example of the processing process of the analysis system 1 of the second example embodiment. The matters already explained are omitted.

Each processing of Steps S11-S14 is the same as each processing of Steps S1-S4 shown in FIG. 10, respectively.

Next, the time information identification unit 14 identifies the time information for each device on each attack route detected in Step S13. Next, the countermeasure identification unit 10 derives the time information for each attack route detected in Step S13 based on the identified time information (Step S15).

Each processing of Steps S16-S17 is the same as each processing of Steps S5-S6 shown in FIG. 10, respectively.

Next, the display control unit 12 superimposes the network topology and displays the attack route detected in Step S13 on the display device 13 together with the damage information identified in Step S16. When displaying the attack route, the display control unit 12 also displays on the same screen the evaluation value computed in Step S14, the time information derived in Step S15, and the countermeasure plan identified in Step S17 and its cost (Step S18).

According to this example embodiment, as described above, the display control unit 12 displays the time until the damage reaches the device on the attack route on the display device 13. Thus, the administrator can easily select a countermeasure plan for the attack route considering the time constraints.

Note that multiple pieces of software may be installed in each device, and each software may have multiple vulnerabilities. If a new vulnerability is discovered, the administrator should update each table illustrated in FIGS. 4-6 and 12.

Figure 15:
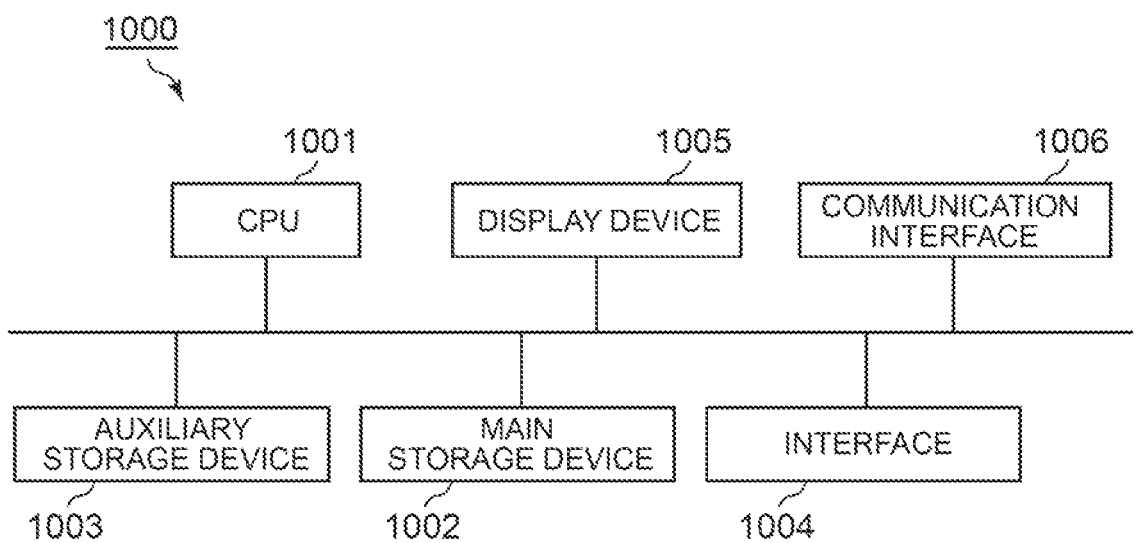
FIG. 15 is a schematic block diagram showing a computer configuration for the analysis system of each example embodiment of the present invention.

FIG. 15 is a schematic block diagram showing a computer configuration for the analysis system 1 of each example embodiment of the present invention. The computer 1000 includes a CPU 1001, a main storage device 1002, an auxiliary storage device 1003, an interface 1004, a display device 1005, and a communication interface 1006.

The analysis system 1 of each example embodiment of the present invention is realized by a computer 1000. The operation of the analysis system 1 is stored in the auxiliary storage device 1003 in the form of an analysis program. The CPU 1001 reads the analysis program from the auxiliary storage device 1003, expands it to the main storage device 1002, and executes the processing described in the above each example embodiment according to the analysis program.

The auxiliary storage device 1003 is an example of a non-transitory tangible medium. Other examples of non-transitory tangible media include a magnetic disk, a magneto-optical disk, CD-ROM (Compact Disk Read Only Memory), DVD-ROM (Digital Versatile Disk Read Only Memory), semiconductor memory, and the like, which are connected via an interface 1004. When the program is delivered to the computer 1000 via a communication line, the computer 1000 receiving the delivery may expand the program into the main memory device 1002 and execute the processing described in the above each example embodiment according to the program.

Some or all of the components may be realized by general-purpose or dedicated circuitry, processors, or a combination of these. They may be configured with a single chip, or configured with the plurality of chips connected via a bus. Some or all of each component may be realized by a combination of the above-mentioned circuitry, etc. and programs.

When some or all of each component is realized by the plurality of information processing devices, circuitry, etc., the plurality of information processing devices, circuitry, etc. may be centrally located or distributed. For example, the information processing devices, circuitry, etc. may be implemented as a client-and-server system, cloud computing system, etc., each of which is connected via a communication network.

Figure 16:
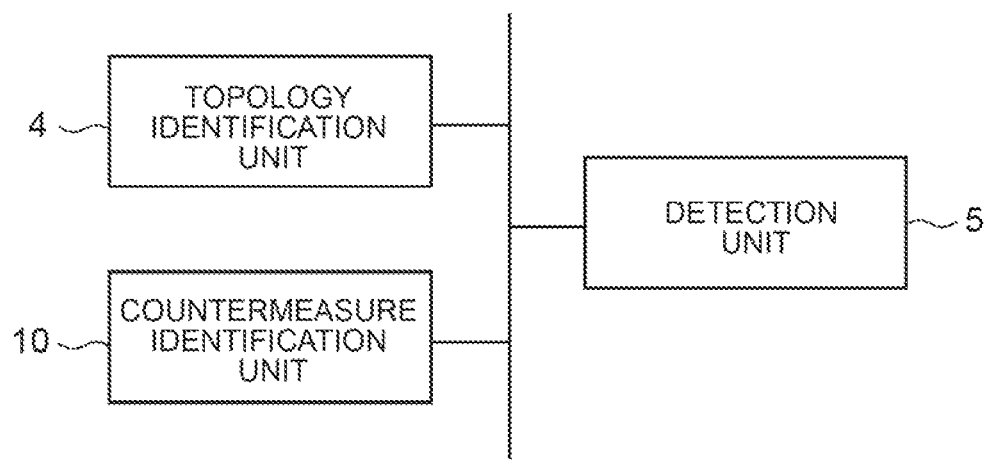
FIG. 16 is a block diagram showing an overview of an analysis system according to the present invention.

Next, an overview of the present invention will be described. FIG. 16 is a block diagram depicting an overview of an analysis system according to the present invention. The analysis system of the present invention includes a topology identification unit 4, a detection unit 5, and a countermeasure identification unit 10.

The topology identification unit 4 identifies a network topology of devices included in the system to be diagnosed.

The detection unit 5 detects attack routes that indicate flows of attacks that can be executed in the system to be diagnosed, based on security information about each device.

The countermeasure identification unit 10 identifies countermeasure plans to prevent the attacks and a cost required to implement the countermeasure plans.

Such a configuration allows the analysis system to present bases for an administrator to select security measures to be implemented in the system to be diagnosed.

The above example embodiments of the present invention can be described as, but not limited to, the following supplementary notes.

(Supplementary Note 1)
An analysis system comprising:
a topology identification unit that identifies a network topology of devices included in a system to be diagnosed;
a detection unit that detects attack routes that indicate flows of attacks that can be executed in the system to be diagnosed, based on security information about each device; and
a countermeasure identification unit that identifies countermeasure plans to prevent the attacks and costs required to implement the countermeasure plans.

(Supplementary Note 2)
The analysis system according to supplementary note 1, further comprising:
a damage identification unit that identifies damage information that indicates content of damage of devices on the attack routes when the devices are attacked,
wherein the countermeasure identification unit identifies countermeasure plans based on the identified damage information.

(Supplementary Note 3)
The analysis system according to supplementary note 1 or 2,
wherein the countermeasure identification unit identifies countermeasure plans and costs for each device on the attack routes.

(Supplementary Note 4)
The analysis system according to any one of supplementary notes 1 to 3, further comprising:
a display control unit that displays the attack routes on a display device by superimposing the attack routes on the network topology.

(Supplementary Note 5)
The analysis system according to supplementary note 4, further comprising:
an evaluation value derivation unit that derives an evaluation value that indicates degree of risk from an attack, for each attack route,
wherein the display control unit displays the evaluation value derived for the attack route, the countermeasure plan identified for the attack route, and a cost together with the attack route on the display device.

(Supplementary Note 6)
The analysis system according to supplementary note 5,
wherein the display control unit displays the damage information near the devices on the attack routes.

(Supplementary Note 7)
The analysis system according to supplementary note 5 or 6, further comprising:
a time information identification unit that identifies time information that represents degree of time required to attack a device, for each device on each attack route,
wherein the display control unit displays the time information identified for the device on the attack route together with the attack route on the display device.

(Supplementary Note 8)
The analysis system according to supplementary note 7,
wherein the display control unit displays the time information that represents degree of the shortest time among a plurality of the identified time information.

(Supplementary Note 9)
An analysis method, implemented by a computer, comprising:
identifying a network topology of devices included in a system to be diagnosed;
detecting attack routes that indicate flows of attacks that can be executed in the system to be diagnosed, based on security information about each device; and
identifying countermeasure plans to prevent the attacks and costs required to implement the countermeasure plans.

(Supplementary Note 10)

An analysis program causing a computer to execute:

a topology identification process of identifying a network topology of devices included in a system to be diagnosed;

a detection process of detecting attack routes that indicate flows of attacks that can be executed in the system to be diagnosed, based on security information about each device; and a countermeasure identification process of identifying countermeasure plans to prevent the attacks and costs required to implement the countermeasure plans.

Although the invention of the present application has been described above with reference to example embodiments and examples, the present invention is not limited to the above example embodiments and examples. Various changes can be made to the configuration and details of the present invention that can be understood by those skilled in the art within the scope of the present invention.

This application is based upon and claims the benefit of priority from Japanese patent application No. 2020-052831 filed on Mar. 24, 2020, the disclosure of which is incorporated herein in its entirety by reference.

INDUSTRIAL APPLICABILITY

This invention is suitably applied to analysis systems that display attack routes.

REFERENCE SIGNS LIST

1 Analysis system
2 Data collection unit
3 Data storage unit
4 Topology identification unit
5 Detection unit
6 Evaluation value derivation unit
7 Risk information storage unit
8 Damage information storage unit
9 Damage identification unit
10 Countermeasure identification unit
11 Countermeasure information storage unit
12 Display control unit
13 Display device
14 Time information identification unit
15 Time information storage unit

What is claimed is:

1. An analysis system comprising:

a memory storing software instructions; and one or more processors configured to execute the software instructions to:

identify a network topology of devices included in a system to be diagnosed;

detect attack routes that indicate flows of attacks that can be executed in the system to be diagnosed, based on security information about each device;

identify countermeasure plans to prevent the attacks and costs required to implement the countermeasure plans;

display the attack routes on a display device by superimposing the attack routes on the network topology;

derive an evaluation value that indicates a degree of risk from an attack, for each attack route;

identify time information that represents a degree of time required to attack a device, for each device on each attack route;

display, for each attack route, the evaluation value derived for the attack route, the countermeasure plan identified for the attack route, and a cost together with the attack route on the display device; and display, for each attack route, the time information identified for the device on the attack route together with the attack route on the display device.

2. The analysis system according to claim 1, wherein the one or more processors are further configured to execute the software instructions to:

identify damage information that indicates content of damage of devices on the attack routes when the devices are attacked, wherein the one or more processors identify the countermeasure plans based on the identified damage information.

3. The analysis system according to claim 2, wherein the one or more processors identify the countermeasure plans and the costs for each device on the attack routes.

4. The analysis system according to claim 1, wherein the one or more processors identify the countermeasure plans and the costs for each device on the attack routes.

5. The analysis system according to claim 1, wherein the one or more processors display the damage information that indicates content of damage of devices on the attack routes when the devices are attacked near the devices on the attack routes.

6. The analysis system according to claim 1, wherein the one or more processors display the time information that represents a degree of the shortest time among a plurality of the identified time information.

7. An analysis method performed by a computer and comprising:

identifying a network topology of devices included in a system to be diagnosed;

detecting attack routes that indicate flows of attacks that can be executed in the system to be diagnosed, based on security information about each device;

identifying countermeasure plans to prevent the attacks and costs required to implement the countermeasure plans;

displaying the attack routes on a display device by superimposing the attack routes on the network topology;

deriving an evaluation value that indicates a degree of risk from an attack, for each attack route;

identifying time information that represents a degree of time required to attack a device, for each device on each attack route;

displaying, for each attack route, the evaluation value derived for the attack route, the countermeasure plan identified for the attack route, and a cost together with the attack route on the display device; and displaying, for each attack route, the time information identified for the device on the attack route together with the attack route on the display device.

8. A non-transitory computer-readable storage medium storing an analysis program causing a computer to execute processes comprising:

identifying a network topology of devices included in a system to be diagnosed;

detecting attack routes that indicate flows of attacks that can be executed in the system to be diagnosed, based on security information about each device;

identifying countermeasure plans to prevent the attacks and costs required to implement the countermeasure plans;

displaying the attack routes on a display device by superimposing the attack routes on the network topology;

deriving an evaluation value that indicates a degree of risk from an attack, for each attack route;

identifying time information that represents a degree of time required to attack a device, for each device on each attack route;

displaying, for each attack route, the evaluation value derived for the attack route, the countermeasure plan identified for the attack route, and a cost together with the attack route on the display device; and displaying, for each attack route, the time information identified for the device on the attack route together with the attack route on the display device.

* * * * *